Jan. 3, 1928.
W. PELTIER
1,654,700
GATE OPERATING MEANS
Filed Aug. 19, 1926
2 Sheets-Sheet 2
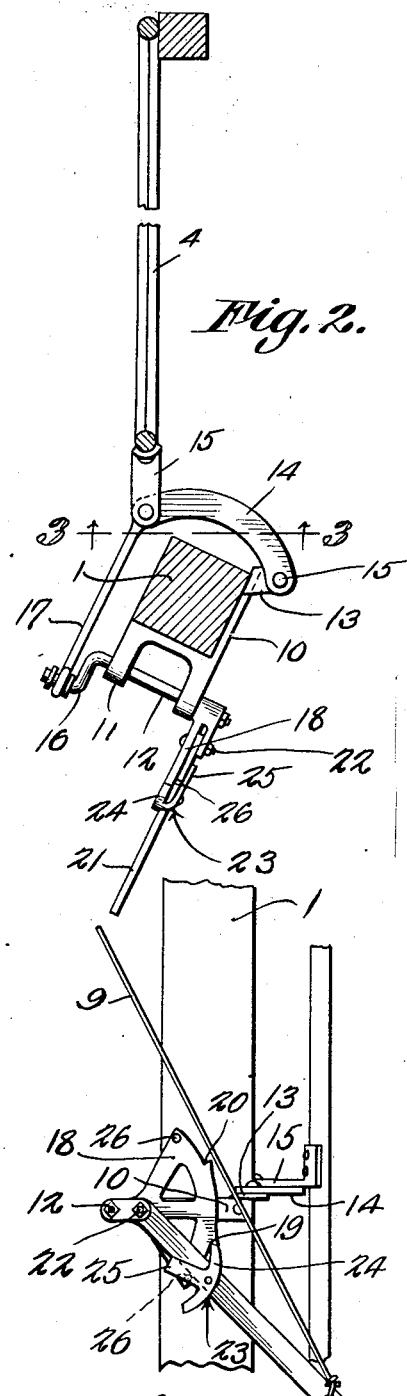
Fig. 2.
Fig. 5.
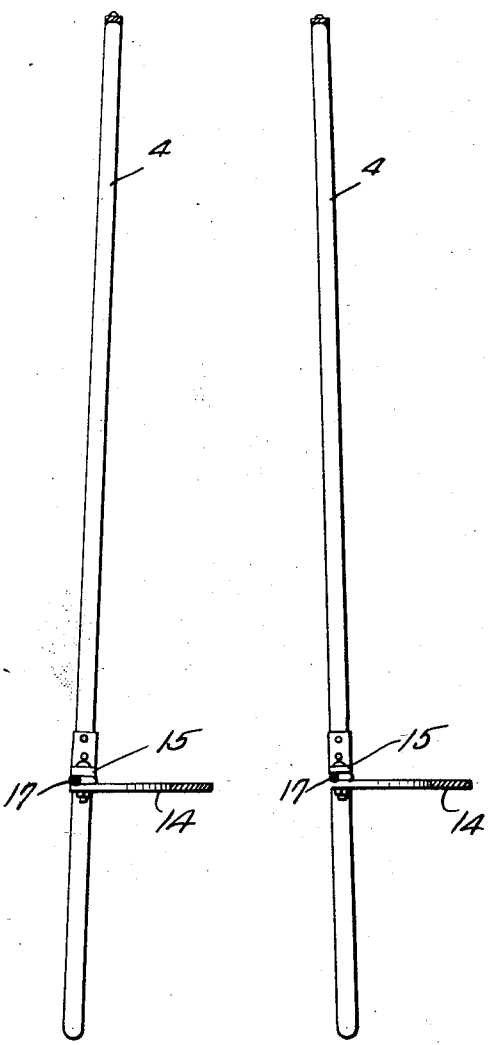
Fig. 3.   Fig. 4.
Wilfrid Peltier
Inventor,
By C A Snow & Co.
Attorneys.

Patented Jan. 3, 1928.

1,654,700

UNITED STATES PATENT OFFICE.

WILFRID PELTIER, OF CONCORDIA, KANSAS.

GATE-OPERATING MEANS.

Application filed August 19, 1926. Serial No. 130,247.

This invention relates to means for operating gates, one of the objects being to provide a structure including an actuating rope or the like which, when pulled, will shift one of the hinges of the gate so that the gate will swing from one extreme position to another gradually and without requiring any jerking action on the part of the operator.

A further object is to provide mechanism of this character which can be installed readily, can be operated easily, and which allows the gate to swing smoothly to either open or closed position.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings the preferred form of the invention has been shown.

In said drawings,

Figure 2 is a section on line 2—2, Figure 1.

Figure 3 is a section on line 3—3, showing the position of the gate when at one extreme of its movement.

Figure 4 is a view similar to Figure 3 showing the position of the gate when shifted for movement to its other extreme position.

Figure 5 is an elevation of a portion of the gate operating mechanism showing, in full lines, the positions of the parts as disclosed by broken lines in Figure 1.

Figure 1:
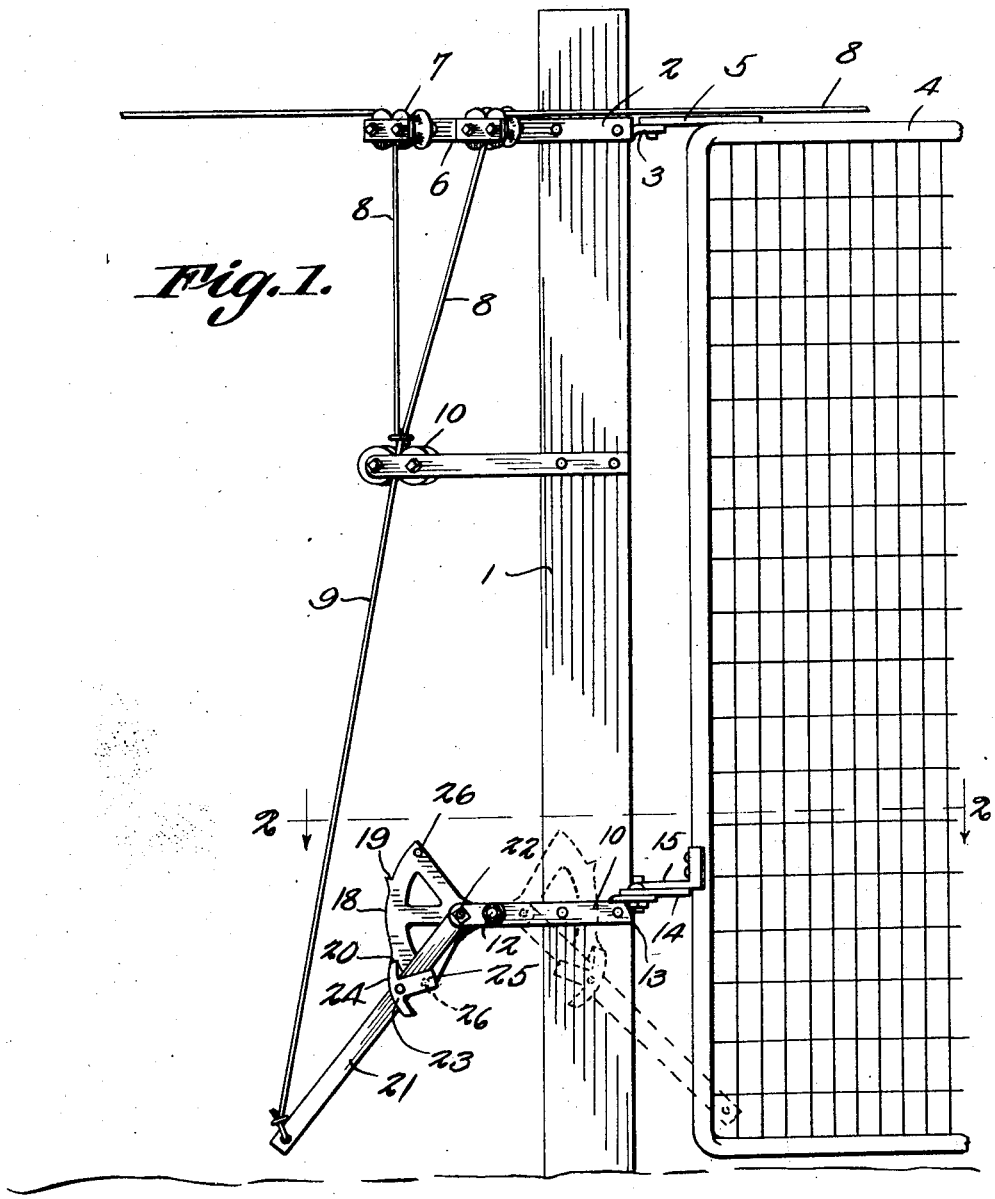
Figure 1 is an elevation of a portion of a gate having the present improvements combined therewith, one of the positions of the gate shifting mechanism being indicated by full lines and another position being indicated by broken lines.

Referring to the figures by characters of reference 1 designates a post the top of which is engaged by a looped strap 2 or the like from which is extended one of the hinge members 3. The gate 4 is connected to this hinge member through a hinge member 5 extending therefrom. An arm 6 is preferably extended outwardly from the strap from supporting spaced pairs of pulleys 7 adapted to be engaged by actuating ropes 8 extending in opposite directions from the gate and connected together at a point below the pulleys. These ropes 8, in turn, have an extension 9 extending downwardly therefrom between guide pulleys 10 connected to the post 1 and the lower end of the rope 9 is connected to and adapted to actuate the gate shifting mechanism.

Connected to the lower portion of the post 1 is a strap or bracket 10 having ears 11 in which is journaled a shaft 12. Another ear 13 is extended from this bracket and has a link 14 pivotally connected thereto at 15' so as to swing horizontally. The free end portion of this link is pivotally engaged by the hinged member 15 of the gate 4, this hinged member being located adjacent the lower portion of the gate. The shaft 12 is provided at one end with a crank arm 16 and a link 17 connects this crank arm to the hinged member 15. Secured to the other end portion of the shaft 12 is a segment 18 adjacent the ends of which are teeth 19 and 20. A lever 21 is pivotally mounted on a stud 22 extending from the segment and its free end is attached to the rope 9. Pivotally mounted on this lever is a T-shaped pawl 23 having oppositely extending heads 24 either of which is adapted to engage the teeth 19 and 20 respectively. The middle portion of this pawl constitutes a weight indicated at 25 so that when the lever is in the position shown, for example, by full lines in Figure 1, this weight 25 will hold the upper head of the pawl in engagement with the tooth 20 whereas, when the lever is swung through an arc upwardly past the dead center, the tooth 20 will become disengaged from the pawl and the weight 25 will throw the pawl so as to bring its other head in engagement with the tooth 19 as shown, for example, in Figure 5. Stops 26 can be mounted on the segment for limiting the movement of the lever relative thereto.

Assuming that the gate is closed, as shown in Figure 2, the operating mechanism is positioned as shown in Figure 2 while the gate is slightly tilted so that the lower portion thereof is extended away from the post past the dead center as illustrated in Figure 3. Consequently the gate stays closed by gravity because the lower end thereof is out of vertical alinement with the upper hinge. When it is desired to open the gate the operator pulls on one of the ropes 8 with the result that lever 21 swings upwardly and laterally toward the dead center. During this upward movement pawl 22 thrusts against tooth 20 and causes the segment 18 to swing upwardly toward the dead center and at the same time rotate shaft 12. During this movement the shaft will thrust through link 17 against the lower end 15 of the gate and push said lower hinge past the dead center so that the gate will be tilted in the opposite direction as indicated in Figure 4 and the gate will be caused to swing by gravity to its open position. This movement of the gate will carry the segment 18 and the lever 21 past their dead centers. When lever 22 passes the dead center the weight 25 of the pawl will cause said pawl to shift so that the lever can swing downwardly freely until it comes against the lowermost stop 26 at which time the pawl will be reversed and positioned to engage the lower tooth 19 as shown in Figure 5. Thus the parts are reset to reverse the operation of the gate.

What is claimed is:

1. The combination with a post, of a gate, a stationary hinge connecting the upper portion of the gate to the post, links pivotally connected to the lower portion of the post, a hinge connection between said links and the lower portion of the gate, a shaft, means actuated by the back and forth rotation of the shaft for imparting a back and forth swinging movement to the links, thereby to tilt the gate to cause it to swing in either of two directions, an operating rope, and means actuated by successive pulls upon said rope for imparting an initial rotation to the shaft in either of two directions, said gate, when tilted by said shaft and the means operated thereby, constituting means for completing the rotation of the shaft in either direction.

2. The combination with a post, of a gate, a stationary hinged connection between one portion of the gate and the post, a link mounted to swing relative to the post, a hinge connection between the link and the gate, a shaft, a crank arm thereon, a connection between the crank arm and the link, a lever, means for swinging the lever through an arc upwardly past its dead center, and means operated by each upward movement of the lever for rotating the shaft, thereby to shift the link and cause the gate to swing in either of two directions.

3. The combination with a post, a gate, a stationary hinge connection between the post and a portion of the gate, a link mounted to swing relative to the post, a hinge connection between the link and the gate, a shaft, means actuated by the back and forth rotation of the shaft for swinging the link relative to the post, thereby to move its hinge connection with the gate into and out of vertical alinement with the stationary hinge, a toothed segment rotatable with the shaft, a lever mounted to swing relative to the segment, and a weighted pawl carried by the lever for engagement with the toothed segment when the segment and lever are swung downwardly in the same direction to either limit of their movements, and means for actuating the lever to actuate the segment and operate the shaft.

In testimony that I claim the foregoing as my own, I have hereto affixed my signature.

WILFRID PELTIER.